United States Patent
Angelo et al.

(10) Patent No.: US 6,878,426 B2
(45) Date of Patent: Apr. 12, 2005

(54) RECORDING MEDIA WITH MECHANICALLY PATTERNED LANDING ZONE

(75) Inventors: James Edward Angelo, Burnsville, MN (US); Mukund Channagiri Rao, Oklahoma City, OK (US); Alexei Hiram Sacks, Edina, MN (US); Timothy Francis Ellis, Tonka Bay, MN (US); David Kuo, Palo Alto, CA (US); Serge Jacques Fayeulle, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/669,361

(22) Filed: Sep. 25, 2003

(65) Prior Publication Data

US 2004/0058060 A1 Mar. 25, 2004

Related U.S. Application Data

(62) Division of application No. 09/953,618, filed on Sep. 17, 2001, now Pat. No. 6,627,254.
(60) Provisional application No. 60/233,920, filed on Sep. 20, 2000.

(51) Int. Cl.⁷ ................................................ G11B 5/82
(52) U.S. Cl. .................. 428/65.3; 428/332; 428/426; 428/409; 428/694 SG
(58) Field of Search ................ 428/65.3, 426, 428/694 SG, 332, 409

(56) References Cited

U.S. PATENT DOCUMENTS

| | | | | |
|---|---|---|---|---|
| 5,976,714 A | * | 11/1999 | Arita et al. | 428/694 TR |
| 6,020,045 A | | 2/2000 | Chen et al. | |
| 6,094,413 A | | 7/2000 | Guerra | |
| 6,246,543 B1 | | 6/2001 | Baumgart et al. | |
| 6,267,864 B1 | | 7/2001 | Yadav et al. | |
| 6,287,663 B1 | * | 9/2001 | Goto | 428/65.3 |

* cited by examiner

Primary Examiner—Stevan A. Resan
(74) Attorney, Agent, or Firm—McDermott Will & Emery LLP

(57) ABSTRACT

A method of manufacturing a magnetic recording medium, comprises steps of providing a non-magnetic substrate for a magnetic medium, the substrate including at least one major surface having a contact start/stop (CSS) or landing zone and a data zone; and forming a pattern of recesses in the substrate surface in said CSS or landing zone by embossing utilizing a stamper having a surface including a negative image pattern of said pattern of recesses. Embodiments of the invention include magnetic media comprising a non-magnetic substrate including at least one major surface having a contact start/stop (CSS) or landing zone and a data zone, said substrate surface in said CSS or landing zone comprising an embossed pattern of recesses. In addition, the data zone of the substrate surface may include an embossed servo pattern formed simultaneously with the embossed pattern of recesses formed in the landing zone.

16 Claims, 1 Drawing Sheet

Checker board pattern

Checker board pattern

Sinusoidal pattern

Checker board pattern

RECORDING MEDIA WITH MECHANICALLY PATTERNED LANDING ZONE

CROSS-REFERENCE TO PROVISIONAL APPLICATION

This application is a divisional of application Ser. No. 09/953,618 filed Sep. 17, 2001, now U.S. Pat. No. 6,627,254, which claims benefit of Ser. No. 60/233,920 Sep. 20, 2000.

FIELD OF THE INVENTION

The present invention relates to methods and apparatus for forming patterned landing zones, as well as servo patterns, in substrates for magnetic recording media utilized in high areal and high track density applications, and to magnetic recording media produced thereby. The invention has particular utility in the manufacture of magnetic data/information storage and retrieval media, e.g., hard disks, utilizing conventional metal-based substrate materials, e.g., of Al or an Al alloy, as well as very hard surfaced, high modulus substrates, e.g., of glass, ceramic, and glass-ceramic materials.

BACKGROUND OF THE INVENTION

Magnetic recording media are widely used in various applications, particularly in the computer industry. A portion of a conventional recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

The air bearing design for the head slider/transducer utilized for CSS-type operation as described above provides an interface between the slider and the disk which prevents damage to the disk over the life of the disk/slider/transducer head system, and provides damping in the event the disk drive system undergoes mechanical shock due to vibrations of external origin. The air bearing also provides the desired spacing between the transducer and the disk surface. A bias force is applied to the slider by a flexure armature in a direction toward the disk surface. This bias force is counteracted by lifting forces from the air bearing until an equilibrium state is achieved. The slider will contact the disk surface if the rotating speed of the disk is insufficient to cause the slider to "fly", as during start-up and shut-down phases of the CSS cycle. If the slider contacts a data region of the disk, the data may be lost and the disk permanently damaged.

Referring now to FIG. 2, shown therein in perspective view, is a conventionally configured magnetic hard disk 30 having a CSS (i.e., "landing") zone 36 and a data (i.e., recording) zone 40. More specifically, FIG. 2 illustrates an annularly-shaped magnetic hard disk 30 including an inner diameter 32 and an outer diameter 34. Adjacent to the inner diameter is an annularly-shaped, inner CSS or "landing" zone 36 (however, the landing zone 36 may, in other instances, be located adjacent the outer diameter 34). When disk 30 is operated in conjunction with a magnetic transducer head (not shown in the drawing), the CSS or "landing" zone 36 is the region where the head makes contact with the disk surface during the above-described start-stop cycles or other intermittent occurrences. In FIG. 2, the radially outer edge of the CSS or "landing" zone 36 is indicated by line 38, which is the boundary between CSS zone 36 and data zone 40 where information in magnetic form is stored within the magnetic recording medium layer of disk 30.

It is generally considered desirable for reliably and predictably performing reading and recording operations, and essential for obtaining high areal density magnetic recording, that the transducer head be maintained as close to the disk surface as possible in order to minimize its flying height. Thus, a smooth disk surface is preferred, as well as a smooth opposing surface of the transducer head, thereby permitting the head and the disk to be positioned in very close proximity, with an attendant increase in predictability and consistent behavior of the air bearing supporting the transducer head during motion. However, if the head surface and the recording surface are too flat, the precision match of these surfaces gives rise to friction and "stiction" at the disk surface which causes the transducer head to adhere to the surface, particularly after periods of non-use, thereby making it more difficult for the transducer head to initiate movement therefrom. Excessive stiction and friction during the start-up and stopping phases of the above-described cyclic sequence causes wear of the transducer and disk surfaces, eventually leading to what is referred to as "head crash". Another drawback associated with smooth disk surfaces is lack of durability resulting from the very small amount of lubricant which is retained thereon. Thus, there are competing goals of minimizing transducer head flying height (as by the use of smooth surfaces) and reducing transducer head/disk friction (as by avoiding use of smooth surfaces).

Conventional practices for addressing these apparent competing objectives include providing at least the CSS or "landing" zone of the magnetic disk recording medium with a roughened surface to reduce transducer head/disk friction and stiction by a number of different techniques generally known as "texturing". Referring again to FIG. 1, current texturing techniques (see, e.g., U.S. Pat. Nos. 5,062,021 and 5,108,781) include, inter alia, circumferential polishing and localized laser heating of the surface of the disk substrate 10 (e.g., of Al—Mg alloy) to create thereon a texture pattern comprising a plurality of spaced apart projections ("bumps") prior to deposition thereon of a layer stack comprised of plating layer 12, polycrystalline seed or underlayer 12, magnetic layer 13, protective overcoat 14, and lubricant topcoat 15, wherein the textured surface of the underlying disk substrate 10 is substantially replicated in the subsequently deposited, overlying layers. According to such methodology, by providing a textured surface in at least the CSS or "landing" zone, the transducer head is able to rest and slide on the peaks of the projections or "bumps" during starting and stopping, thereby reducing the area of contact between the transducer head and the magnetic medium. As a consequence of the reduced area of contact in the CSS or "landing" zone, the amount of force necessary to initiate movement of the transducer head is considerably reduced. An additional advantage provided by the textured disk surface is the ability to retain a greater amount of lubricant, thereby further increasing disk durability by reducing friction and stiction.

A variety of possible configurations of the textured surface approach for reducing stiction and friction between the transducer head and the disk surface are possible, including texturing only the CSS or "landing" zone, wherein specular smoothness of the data zone is retained for permitting high bit density recording by allowing for very low head flying height; texturing the entire disk surface, i.e., the CSS and data zones, whereby friction and stiction reduction is provided in the data zone in addition to the CSS zone; and separately (i.e., differently) textured CSS and data zones, with and without a transition zone between the differently textured zones, wherein the texturing is optimized for each type of zone to maximize both recording characteristics and mechanical durability.

As indicated above, current methodology for selective texturing of the CSS or landing zone of disk-shaped recording media utilizes localized laser heating of the substrate surface to effect melting of the substrate material, which upon re-solidification results in the formation of protrusions, termed "laser bumps" on the disk surface. The bumps dramatically reduce the real area of contact over that which is obtained in the absence of the bumps, which reduced area of contact has a significant impact on the stiction and friction behavior of the head-disk interface. However, texturing of the CSS or landing zone according to the conventional laser texturing process entails a number of disadvantages, including:

(1) currently available lasers cannot texture glass or glass-based substrates, and a sizable capital investment would be required to develop and manufacture lasers and laser systems suitable for rapid, economical (i.e., cost-effective) texturing of glass or glass-based substrates;

(2) the "laser bumps" produced according to conventional laser-based methodology protrude from the disk surface, which protrusions can interfere with the operation of the flying head at very small head-disk spacings;

(3) laser texturing performed according to conventional practices results in a reduction in the width of the recording band by several tens of mils, due to the inherent mechanical "slop" of the laser texture process; and (4) the laser texture is not precisely aligned with the data tracks because the latter are not written at the same time the laser bumps are formed, which lack of precise alignment limit the width of the recording band.

Also as indicated above, disk drives typically comprise a magnetic head assembly mounted on the end of a support or actuator arm which positions the head radially over the disk surface. If the actuator arm is held stationary, the magnetic head assembly will pass over a circular path on the disk surface known as a track, and information can be read from or written to that track. Each concentric track has a unique radius, and reading and writing information from or to a specific track requires the magnetic head to be located above the track. By moving the actuator arm, the magnetic head assembly is moved radially over the disk surface between tracks.

The disk drive must be able to differentiate between tracks on the disk and to center the magnetic head over any particular track. Most disk drives use embedded "servo patterns" of magnetically recorded information on the disk. The servo patterns are read by the magnetic head assembly to inform the disk drive of the track location. Tracks typically include both data sectors and servo patterns. Each data sector contains a header followed by a data section. The header may include synchronization information to synchronize various timers in the disk drive to the speed of disk rotation, while the data section is used for recording data. Typical servo patterns are described in, for example, U.S. Pat. No. 6,086,961, the disclosure of which is incorporated herein by reference.

Servo patterns are usually written on the disk during manufacture of the disk drive, after the drive is assembled and operational. The servo pattern information, and particularly the track spacing and centering information, needs to be located very precisely on the disk surface. However, at the time the servo patterns are written, there are no reference locations on the disk surface which can be perceived by the disk drive. Accordingly, a highly specialized device known as a "servo-writer" is used during writing of the servo-patterns. Largely because of the locational precision needed, servo-writers are expensive, and servo-writing is a time-consuming process.

A process for forming servo patterns involves use of standard lithographic techniques to remove magnetic material from the magnetic recording layer or by creating recessed zones or valleys in the substrate prior to deposition of the magnetic material. In the former case, the magnetic recording material is etched or ion milled through a resist mask to leave a system of valleys which are void of magnetic material. In the latter case, the magnetic film, which is applied to the textured substrate including recessed zones or valleys, is spaced far enough away from the recording head such that the magnetic flux emanating from the recording head does not sufficiently write the magnetic medium. Servo track information is conveyed by utilizing the difference in magnetic flux at the boundary between the elevated portions and the valleys of the pattern. However, the lithographic processing required for patterning disadvantageously incurs considerable expense inconsistent with the requirements of cost-effective mass production of disk media.

An approach (utilized by Sony Corp. in the manufacture of "PERM" disks) designed to avoid traditional servo-writing has been to injection mold or stamp servo patterns on a polymer-based substrate disk. A constant thickness layer of magnetic recording material is then applied over the entire disk surface, including the depressions and protrusions of the servo patterns. After all of the constituent layers of the medium have been applied to the disk, a magnetic bias is recorded on the servo patterns. For example, a first magnetic field may magnetically initialize the entire disk at a one setting. Then a second magnetic field, located at the surface of the disk and e.g., provided by the magnetic head of the disk drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disk servo patterns show magnetic transitions between the depressions and the protrusions.

Meanwhile, the continuing trend toward manufacture of very high areal density magnetic recording media at reduced cost provides impetus for the development of lower cost materials, e.g., polymers, glass, ceramics, and glass-ceramics composites as replacements for the conventional Al alloy-based substrates for magnetic disk media. However, poor mechanical and tribological performance, track mis-registration ("TMR"), and poor flyability have been particularly problematic in the case of polymer-based substrates fabricated as to essentially copy or mimic conventional hard disk design features and criteria. On the other hand, glass, ceramic, or glass-ceramic materials are attractive candidates for use as substrates for very high areal density disk recording media because of the requirements for high performance of the anisotropic thin film media and high modulus of the substrate. However, the extreme difficulties encountered with grinding and lapping of glass, ceramic, and glass-ceramic composite materials have limited their use to applications requiring more robust disk drives, such as mobile disk drives for "notebook"-type computers.

Attempts to achieve a desired surface topography on glass, ceramic, or glass-ceramic composite substrates, whether for the data or landing zones, have been unsuccessful due to their extreme hardness (e.g., glass substrates have a Knoop hardness greater than about 760 kg/mm$^2$ compared with about 550 kg/mm$^2$ for Al alloy substrates with NiP plating layers). In addition, the low flowability and extreme hardness of these substrate materials effectively precludes formation of CSS landing zone patterns and servo patterns in the surfaces thereof by injection molding or stamping, as has been performed with polymer-based substrates.

In view of the above, there exists a need for improved methodology and means for rapidly, accurately, and cost-effectively texturing the surfaces of disk substrates for magnetic recording media, which substrates may be constituted of conventional metal-based materials, such as Al-based alloys, or of very hard materials, such as of glass, glass-ceramic, or ceramic, wherein at least one surface of the disk is provided with a patterned CSS or landing zone for optimizing tribological properties when utilized with flying head read/write transducers/heads operating at very low flying heights, and wherein the data zone of the disk is provided with a servo pattern. More specifically, there exists a need for an improved means and methodology for mechanically impressing patterns, e.g., landing zone patterns, as well as servo patterns, by embossing a surface of a substrate for a magnetic recording medium, which substrate may be comprised of a conventional metal-based material or of a very hard material, such as a glass, ceramic, or glass-ceramic composite material. In addition, there exists a need for improved, high areal density magnetic recording media including a substrate having a CSS or landing zone and servo patterns integrally formed therewith, as by embossing.

The present invention addresses and solves problems and difficulties attendant upon the use of conventional surface texturing techniques, e.g., laser texturing, for patterning landing zones and forming servo patterns in various substrate materials utilized in the manufacture of very high areal density magnetic recording media, particularly very hard materials, such as of glass, ceramics, and glass-ceramics, while maintaining full capability with substantially all aspects of conventional automated manufacturing technology for the fabrication of thin-film magnetic media. Further, the methodology and means afforded by the present invention enjoy diverse utility in the manufacture of various other devices and media requiring formation of patterned surfaces by embossing.

DISCLOSURE OF THE INVENTION

An advantage of the present invention is an improved method of manufacturing a magnetic recording medium including a substrate having a landing zone with a pattern of recesses formed therein by embossing.

Another advantage of the present invention is an improved method of manufacturing a magnetic recording medium including a high modulus substrate having a glass or glass-like layer formed on a surface thereof, wherein the surface of the glass or glass-like layer comprises a landing zone having a pattern of recesses formed therein by embossing.

Still another advantage of the present invention is an improved method of manufacturing a magnetic recording medium wherein a pattern of recesses is formed in a landing zone of a substrate surface by embossing, and a servo pattern is simultaneously embossed in a data zone of the substrate surface.

A further advantage of the present invention is an improved magnetic recording medium including a substrate with a landing zone having an embossed recess pattern formed therein for providing improved tribological properties when utilized with transducer heads at sub-micron flying heights.

A still further advantage of the present invention is an improved magnetic recording medium comprised of a high modulus substrate including a sintered glass or glass-like layer formed thereon and having an embossed pattern of recesses formed in a landing zone of the medium.

A yet further advantage of the present invention is an improved magnetic medium comprising a substrate including a surface with a landing zone having an embossed pattern of recesses formed therein and a data zone with an embossed servo pattern formed therein.

Another advantage of the present invention is a stamper having a surface configured for embossing a recess pattern in the surface of a landing zone on the surface of a substrate for a magnetic recording medium.

Yet another advantage of the present invention is a stamper having a surface configured for simultaneously embossing a recess pattern in a landing zone and a servo pattern in a data zone of a substrate for a magnetic recording medium.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium, comprising:

(a) providing a non-magnetic substrate for a magnetic medium, the substrate including at least one major surface having a contact start/stop (CSS) or landing zone and a data zone; and (b) forming a pattern of recesses in the substrate surface in the CSS or landing zone by embossing utilizing a stamper having a surface including a negative image pattern of the pattern of recesses.

According to embodiments of the present invention, step (a) comprises providing an annular disk-shaped substrate wherein the CSS or landing zone comprises an annularly-shaped zone adjacent an inner or outer diameter of the disk and the data zone comprises an annularly-shaped zone radially adjacent the CSS or landing zone; and step (b) comprises forming a rectangularly- or sinusoidally-shaped pattern of recesses.

In accordance with certain embodiments of the present invention, step (b) comprises forming a rectangularly-shaped pattern of recesses, wherein each of the dimensions of the rectangles of the pattern is in the range of from about 0.1 to about 10 μm and the depth of each of the recesses is in the range of from about 10 to about 200 Å; or step (b) comprises forming a sinusoidally-shaped pattern of recesses, wherein the peak-to-peak spacings of adjacent recesses is in the range of from about 0.1 to about 10 μm and the depth of each of the recesses is in the range of from 10 to about 200 Å.

According to embodiments of the present invention, step (a) comprises providing a substrate comprised of a material selected from the group consisting of Al, Al/NiP, Al-based alloys, other metals, other metal alloys, polymers, and polymer-based materials, or a high modulus, hard-surfaced substrate selected from the group consisting of glass, ceramics, and glass-ceramics.

According to particular embodiments of the present invention, step (a) comprises providing a glass, ceramics, or glass-ceramics substrate, wherein step (a) further comprises forming a sol-gel layer on at least the substrate surface in said CSS or landing zone, the sol-gel layer having a surface which is softer than the substrate surface; and step (b) comprises embossing the pattern of recesses in the surface of the sol-gel layer, wherein step (b) further comprises converting the embossed sol-gel layer to a glass or glass-like layer including the pattern of recesses in the surface thereof.

In accordance with embodiments of the present invention, step (a) comprises forming a sol-gel layer comprising a porous layer of $SiO_2$, containing water and at least one solvent in the pores thereof; and step (b) comprises converting the sol-gel layer to the glass or glass-like layer by sintering at a temperature of from about 300 to above about 1000° C.

According to further embodiments of the present invention, step (b) comprises simultaneously forming the pattern of recesses in the substrate surface in the CSS or landing zone and forming a servo pattern in the substrate surface in the data zone; and step (b) comprises embossing utilizing a stamper having a surface including negative image patterns of the pattern of recesses and the servo pattern.

In accordance with further embodiments of the present invention, the method further comprises the step of:

(c) forming a stack of thin film layers over at least the substrate surface in the data zone, the stack of layers including at least one ferromagnetic recording layer.

Another aspect of the present invention is a magnetic recording medium, comprising:

a non-magnetic substrate including at least one major surface having a contact start/stop (CSS) or landing zone and a data zone, the substrate surface in the CSS or landing zone comprising an embossed pattern of recesses.

According to embodiments of the present invention, the substrate is annular disk-shaped, the CSS or landing zone comprises an annularly-shaped zone adjacent an inner or outer diameter of the disk, and the data zone comprises an annularly-shaped zone radially adjacent the CSS or landing zone.

In accordance with particular embodiments of the present invention, the pattern of recesses comprises a plurality of rectangularly-shaped recesses, wherein each of the dimensions of the rectangles of the pattern is in the range of from about 0.1 to about 10 μm and the depth of each of the recesses is in the range of from about 10 to about 200 Å; whereas, according to other particular embodiments of the invention, the pattern of recesses comprises a plurality of sinusoidally-shaped recesses, wherein the peak-to-peak spacings of adjacent recesses is in the range of from about 0.1 to about 10 μm and the depth of each of the recesses is in the range of from 10 to about 200 Å.

Embodiments of the present invention include media wherein the substrate is comprised of a material selected from the group consisting of Al, Al/NiP, Al-based alloys, other metals, other metal alloys, polymers, and polymer-based materials, or a high modulus, hard-surfaced substrate selected from the group consisting of glass, ceramics, and glass-ceramics.

According to particular embodiments of the present invention, the substrate comprises glass, ceramics, and glass-ceramics and further includes a glass or glass-like layer on at least the substrate surface in the CSS or landing zone, the glass or glass-like layer being derived from a sol-gel layer and including a surface with the pattern of recesses formed therein; whereas, according to further embodiments of the invention, the substrate surface in the data zone comprises an embossed servo pattern.

Media fabricated according to the present invention further comprise a stack of thin film layers formed over at least the substrate surface in the data zone, the stack of layers including at least one ferromagnetic recording layer.

Yet another aspect of the present invention is a stamper for embossing at least one pattern of recesses in a surface of a substrate for a magnetic recording medium, the substrate surface including spaced-apart landing and data zones, the stamper comprising:

(a) a main body including a surface; and (b) means for embossing a pattern of recesses in the landing zone of the substrate surface.

According to an embodiment of the present invention, the stamper further comprises:

(c) means for simultaneously embossing a servo pattern in said data zone of said substrate surface.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawing, in which the features are not drawn to scale but rather are drawn as to best illustrate the pertinent features, wherein.

DESCRIPTION OF THE INVENTION

Figure 1:
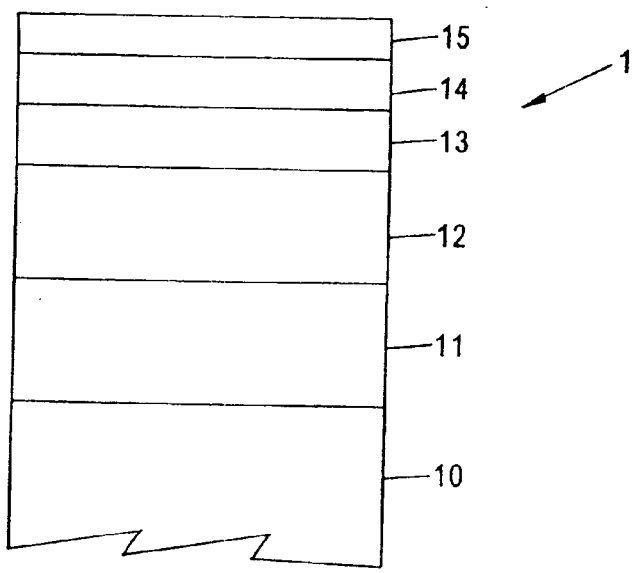
FIG. 1 schematically illustrates, in cross-sectional view, a portion of a conventional thin-film magnetic disk recording medium.
Figure 2:
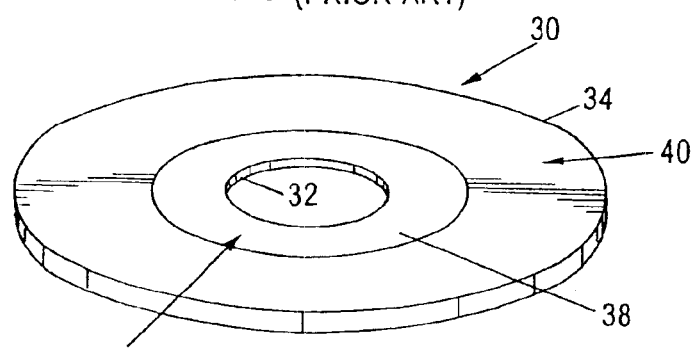
FIG. 2 is a perspective view of a magnetic disk of the type shown in FIG. 1, for illustrating the CSS landing and data recording zones thereof.

The present invention addresses and solves problems attendant upon the use of conventional techniques for forming texture patterns in specific surface areas or zones of a magnetic recording medium, e.g., the CSS landing and data zones of disk-shaped, high areal and high track density magnetic recording media, and is based upon the discovery that conventional surface patterning or texturing techniques, e.g., laser texturing, incur several significant drawbacks when utilized for texturing or patterning of the CSS or landing zone. Specifically, conventional laser texturing cannot be applied to glass, ceramics, or glass-ceramic substrates, adds significant cost to the manufacturing process when utilized with laser-compatible substrates, such as of Al or an Al-alloy, and results in the formation of "bumps" which protrude from the disk surface and interfere with operation of the flying head. Moreover, the laser texturing process is inherently imprecise, disadvantageously decreasing the usable width of the data recording zone or band and resulting in poor alignment of the laser-produced texture with the data tracks, due to the latter being written at a different time than when the laser texturing is performed.

According to the present invention, each of the difficulties, disadvantages, and drawbacks of the conventional laser texturing methodology is overcome by means of a simple, rapid, cost-effective, and conveniently performed embossing process, wherein a texture pattern comprising a plurality of recesses, rather than a plurality of protrusions, is formed in at least the CSS or landing zone of a substrate for a magnetic recording medium, e.g., an annular disk-shaped substrate, whereby a texture pattern is created which eliminates, or at least substantially reduces, undesirable interference with operation of the flying head of a hard disk-based data/information recording, storage, and retrieval system. The embossing process of the invention is applicable to all manner of substrate materials utilized in the fabrication of thin film magnetic recording media, whether comprised of a metal, e.g., Al or Al/NiP; a metal alloy, e.g., Al—Mg; polymer; glass; ceramics; or glass-ceramics. Moreover, the inventive process is ideally suitable for processing high modulus, very hard-surfaced substrate materials, e.g., of glass, ceramics, or glass-ceramics, when utilized with a sol-gel layer providing a softer surface for facilitating the embossing process. An additional advantage of the inventive pattern embossing methodology is the ability to simultaneously form appropriately textured CSS or landing zones and servo-patterned data zones by use of a single stamper. Thus no special steps, such as cleaning, are required for forming the patterned CSS or landing zone, resulting in cost reduction. A still further advantage provided by the present invention is the precise alignment of the patterned landing and data zones arising from use of the single stamper master, whereby the area of the data zone lost to tolerance requirements is minimized.

Figure 3:
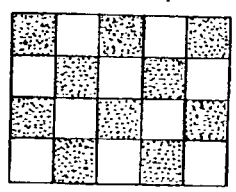
FIG. 3 illustrates an example of a checkerboard recess pattern for use according to the invention.
Figure 5:
FIG. 5 illustrates an example of a sinusoidal recess pattern for use according to the invention.
Figure 4:
FIG. 4 illustrates a cross-section of a checkerboard recess pattern for use according to the invention.

According to the invention, the desired reduction of contact area between the flying head and the CSS or landing zone of the magnetic medium may be obtained with a number of suitably shaped or configured recess patterns, two of which are shown, by way of example only, in FIG. 3. The illustrated checkerboard pattern is very similar to the type of patterns utilized for the servo pattern formed in the landing zone, and includes a plurality of rectangularly- or square-shaped depressions having length and width dimensions in the range from about 0.1 to about 10 $\mu$m and a depth below the surface (as seen from the side view in the figure) in the range from about 10 to about 200 Å. Since the substrate area at the level of the surface is reduced by one-half, it is expected that the stiction and friction between the media surface and the flying head would be reduced by a similar amount, i.e., about 50%. The illustrated sinusoidal-like pattern, comprising a plurality of spaced apart peaks (at the level of the surface) and valleys (below the level of the surface), wherein the peak-to-peak spacing of adjacent peaks is in the range from about 0.1 to about 10 $\mu$m and the depth of each valley is in the range from about 10 to about 200 Å, provides an even greater reduction in contact area, hence a greater reduction in stiction and friction than that provided by the checkerboard pattern.

Either of the illustrated patterns, as well as other, differently configured but similarly performing recess patterns, can be readily formed in the CSS or landing zone of conventional substrate materials utilized in the manufacture of thin film magnetic recording media, such as hard disks. Stampers with a negative image of the desired CSS or landing zone recess pattern formed in a stamping surface comprised of a hard, durable material, e.g., may be employed with a variety of typical substrate materials for magnetic disk media, including Al, Al/NiP, and Al-based alloys, such as Al—Mg, whereas hydrophobic polymer-surfaced stampers may be employed with sol-gel coated glass, ceramics, or glass-ceramic substrate materials. The stamper surface may also include a negative image of a servo pattern to be formed in the data zone of the substrate, in which instance the landing zone recess pattern and the servo pattern are simultaneously formed with the above-mentioned precise alignment between landing and data zones.

The inventive embossing process performed with sol-gel coated high modulus, very hard-surfaced substrate materials, such as of glass, ceramic, or glass-ceramic will now be described. According to the present invention, a relatively soft layer of a sol-gel is initially formed on the surface of the high modulus glass; ceramic, or glass-ceramic composite substrate, e.g., in disk form. By way of illustration, but not limitation, a sol-gel layer having a thickness of from about 0.2 to about 1 μm may be formed on the substrate surface by any convenient technique, e.g., spin coating of a solution of the sol-gel. A suitable sol-gel solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/$H_2O$/$HNO_3$ of 1/4–30/>0.05. The nitric acid acts as a catalyst for conversion of the TEOS or TMOS to a $SiO_2$ sol according to the following reaction, illustratively shown for TEOS:

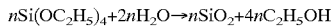

$$nSi(OC_2H_5)_4 + 2nH_2O \rightarrow nSiO_2 + 4nC_2H_5OH$$

with ethanol ($C_2H_5OH$) being produced as a reaction product in solution. After completion of reaction, butanol ($C_4H_9OH$) is added to the solution as a drying retardation agent at molar ratios of TEOS/$H_2O$/$HNO_3$/$C_4H_9OH$ of e.g., 1/5/0.05/>4. Such solution, when applied to the substrate surface, as by spin coating, forms a very smooth film with a minimum amount of surface microwaves. The resultant film or layer is glass-like, principally comprised of silica ($SiO_2$) molecular clusters together with the various solvents ($H_2O$, $C_2H_5OH$, $C_4H_9OH$), and adheres well to the substrate surface. The sol-gel film or layer is of a porous structure with the solvents saturated in the micropores thereof.

According to the inventive methodology, the as-deposited, relatively soft sol-gel film or layer applied to the hard-surfaced substrate is then subjected to the inventive embossing process for forming a recess pattern in the CSS or landing zone of the substrate surface, and, if desired, a servo pattern is simultaneously embossed in the data zone of the substrate surface, each of the patterns comprising a patterned plurality of depressions, by utilizing a stamper having a negative image of the desired landing zone pattern or landing zone and servo patterns. The exposed, upper surface of the relatively soft sol-gel layer may also be subjected to mechanical texturing (after drying in air but prior to sintering), e.g., by a standard NiP texturing process utilizing an abrasive size of about 0.25 μm, in order to enable formation of oriented media critical for achieving high areal density recording.

Subsequent to servo pattern formation (and mechanical texturing, if desired) of the as-deposited, relatively soft sol-gel film or layer, a sintering process is performed at an elevated temperature of from about 300 to above about 1000° C. (depending upon the withstand temperature of the substrate material, which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer into a substantially fully densified glass layer having a density and hardness approaching that of typical silica glass (<1.5 g/cm³), or into a partially densified "glass-like" layer. The embossed landing zone (and servo pattern) formed in the exposed upper surface of the relatively soft sol-gel layer is preserved in the corresponding exposed upper surface of the sintered glass or glass-like layer. Formation of thin film magnetic media on the thus-formed glass-coated, recess-patterned substrates is then accomplished utilizing conventional thin film deposition techniques, e.g., sputtering, for forming the layer stack comprising a polycrystalline underlayer, magnetic layer, and protective overcoat layer.

As indicated above, according to the invention, the step of forming the landing zone (and servo pattern) in the exposed, upper surface of the relatively soft sol-gel film or layer by embossing is typically performed with a stamper (or equivalently performing device) having a negative image of the desired landing zone pattern (and servo pattern). "Clean" release of the stamper from the sol-gel film or layer without sticking is critical for obtaining defect-free servo-patterned surfaces and such "clean" release may be facilitated by use of stampers having a hydrophobic surface.

Thus, the present invention advantageously provides processing techniques and methodologies, including embossing of various substrate materials, such as sol-gel coated high modulus materials, which can be practiced at low cost to yield improved substrates including recess-patterned landing zones and servo-patterned data zones, suitable for use in cost-effective manufacture of high areal recording density magnetic recording media, magnetic recording media including such patterned substrates, and improved stampers for performing the embossing. Moreover, the inventive methodology offers a number of advantages over conventional laser patterning, provides simultaneous patterning of the landing and data zones without requiring servo-writing subsequent to media fabrication, and is fully compatible with all other aspects of automated manufacture of thin film magnetic media.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recording medium, comprising:
   a non-magnetic substrate including at least one major surface having a contact start/stop (CSS) or landing zone and a data zone, said substrate surface in said CSS or landing zone comprising an embossed pattern of recesses, wherein
   said pattern of recesses comprises a plurality of rectangularly-shaped or sinusoidally-shaped recesses.

2. The magnetic recording medium as in claim 1, wherein:
   said substrate is annular disk-shaped, said CSS or landing zone comprises an annularly-shaped zone adjacent an inner or outer diameter of said disk, and said data zone comprises an annularly-shaped zone radially adjacent said CSS or landing zone.

3. The magnetic recording medium as in claim 1, wherein:
said pattern of recesses comprises a plurality of rectangularly-shaped recesses, wherein each of the dimensions of the rectangles of said pattern is in the range of from about 0.1 to about 10 μm and the depth of each of the recesses is in the range of from about 10 to about 200 Å.

4. The magnetic recording medium as in claim 1, wherein:
said pattern of recesses comprises a plurality of sinusoidally-shaped recesses, wherein the peak-to-peak spacings of adjacent recesses is in the range of from about 0.1 to about 10 μm and the depth of each of the recesses is in the range of from 10 to about 200 Å.

5. The magnetic recording medium as in claim 1, wherein:
said substrate is comprised of a material selected from the group consisting of Al, Al/NiP, Al-based alloys, other metals, other metal alloys, polymers, and polymer-based materials, or a high modulus, hard-surfaced substrate selected from the group consisting of glass, ceramics, and glass ceramics ceramic, and glass-ceramic.

6. The magnetic recording medium as in claim 5, wherein:
said substrate comprises glass, ceramic, and glass-ceramic and further includes a glass or glass-like layer on at least said substrate surface in said CSS or landing zone, said glass or glass-like layer being derived from a sol-gel layer and including a surface with said pattern of recesses formed therein.

7. The magnetic recording medium as in claim 1, wherein:
said substrate surface in said data zone comprises an embossed servo pattern.

8. The magnetic recording medium as in claim 1, comprising:
a stack of thin film layers formed over at least said substrate surface in said data zone, said stack of layers including at least one ferromagnetic recording layer.

9. A disk drive comprising a magnetic recording medium, wherein the magnetic recording medium comprises:
a non-magnetic substrate including at least one major surface having a contact start/stop (CSS) or landing zone and a data zone, said substrate surface in said CSS or landing zone comprising an embossed pattern of recesses, wherein
said pattern of recesses comprises a plurality of rectangularly-shaped or sinusoidally-shaped recesses.

10. The disk drive as in claim 9, wherein:
said non-magnetic substrate is annular disk-shaped, said CSS or landing zone comprises an annularly-shaped zone adjacent an inner or outer diameter of said disk, and said data zone comprises an annularly-shaped zone radially adjacent said CSS or landing zone.

11. The disk drive as in claim 9, wherein:
said pattern of recesses comprises a plurality of rectangularly-shaped recesses, wherein each of the dimensions of the rectangles of said pattern is in the range of from about 0.1 to about 10 μm and the depth of each of the recesses is in the range of from about 10 to about 200 Å.

12. The disk drive as in claim 9, wherein:
said pattern of recesses comprises a plurality of sinusoidally-shaped recesses, wherein the peak-to-peak spacings of adjacent recesses is in the range of from about 0.1 to about 10 μm and the depth of each of the recesses is in the range of from 10 to about 200 Å.

13. The disk drive as in claim 9, wherein:
said non-magnetic substrate is comprised of a material selected from the group consisting of Al, AL/NiP, Al-based alloys, other metals, other metal alloys, polymers, and polymer-based materials, or a high modulus, hard-surfaced substrate selected from the group consisting of glass, ceramic, and glass-ceramic.

14. The disk drive as in claim 13, wherein:
said substrate comprises glass, ceramic, and glass-ceramic and further includes a glass or glass-like layer on at least said substrate surface in said CSS or landing zone, said glass or glass-like layer being derived from a sol-gel layer and including a surface with said pattern of recesses formed therein.

15. The disk drive as in claim 14, wherein:
said substrate surface in said data zone comprises an embossed servo pattern.

16. The disk as in claim 9, comprising:
a stack of thin film layers formed over at least said non-magnetic substrate surface in said data zone, said stack of layers including at least one ferromagnetic recording layer.

* * * * *